May 19, 1970  W. C. REISTER ET AL  3,512,205
WINDSHIELD WIPER ARM

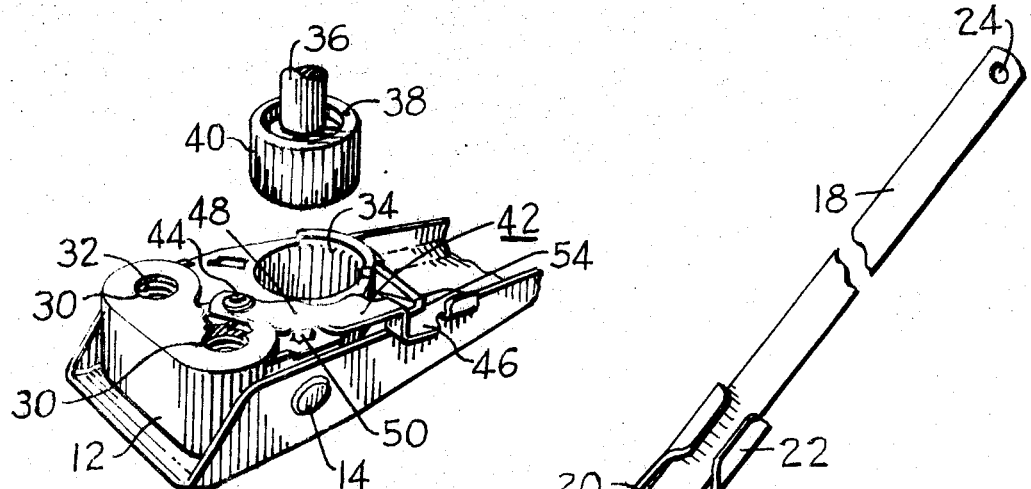
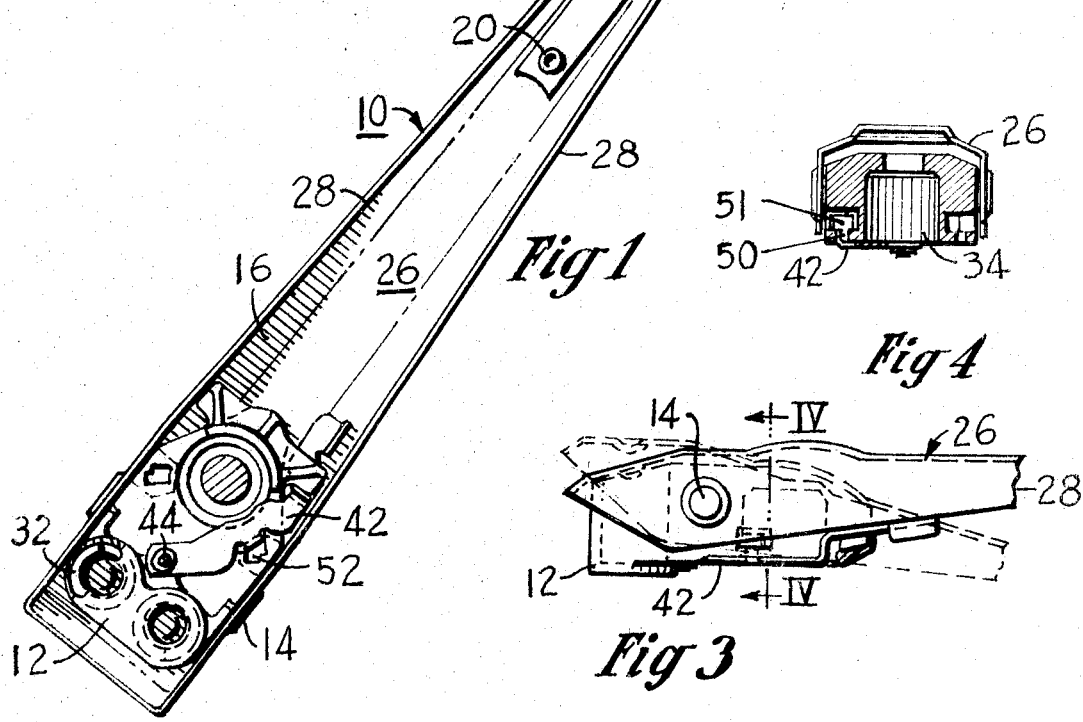

Filed July 5, 1968  2 Sheets-Sheet 2

INVENTORS
WILLIAM C. RIESTER
AND RAYMOND A. DEIBEL
BY
E. Herbert Liss
ATTORNEY

United States Patent Office 3,512,205
Patented May 19, 1970

3,512,205
WINDSHIELD WIPER ARM
William C. Riester, Williamsville, and Raymond A. Deibel, Cheektowaga, N.Y., assignors to Trico Products Corporation, Buffalo, N.Y.
Filed July 5, 1968, Ser. No. 747,763
Int. Cl. B60a 1/04
U.S. Cl. 15—250.34                   7 Claims

ABSTRACT OF THE DISCLOSURE

A windshield wiper arm includes a mounting head having a mounting head cover enveloping the mounting head and pivoted thereto. A pair of conpression springs recessed in the mounting head bear against the web of the mounting head cover to urge the arm against a windshield of a motor vehicle. A recess in the mounting head receives a pivot shaft drive burr in driving engagement. A latch pivoted to the arm head engages the edge of one flange of the mounting head cover in the installation position. In the latching position the latch underlies the drive burr to retain it in the recess. A second form of latch comprises a lever transversely slidable in the mounting head, spring biased to a position where a portion engages the edge of the flange of the arm head cover member to maintain the arm in an installation attitude. In the latching position a portion of the lever underlies the drive burr retaining it in the drive burr recess of the mounting head.

BACKGROUND OF THE INVENTION

The present invention relates to windshield wiper arms and more particularly to an improved arm to shaft connection.

Present conventional wiper arms are retained on the pivot shaft drive burr by a flat spring latch as, for example, that disclosed in U.S. Pat. 2,564,819 by G. Shieberl, issued Aug. 21, 1951, and also in U.S. Pat. 3,344,458 issued on Oct. 3, 1967 to R. A. Deibel et al. The flat spring latch of the type shown in the above-mentioned patents provides excellent arm retention characteristics. However, the improved construction of the present invention facilitates installation and also removal and replacement. For installation purposes it is necessary to maintain the arm in an installation attitude against the force of the arm biasing means. This force may be as much as 40 lbs. in some instances, necessitating the use of a special tool. The arm shown in the above-mentioned U.S. Pat. 3,344,458 requires a special pin to compress the arm pressure springs for facilitating assembly, which pin is removed after assembly and must be available and reinserted to remove the arm for replacement or repair. Withdrawal of the arm from a knurled drive burr requires considerable force to overcome the flat spring type arm retention latch. Thus installation as well as removal can be awkward operations.

With the presently used spring type arm retention latch it is also possible during installation to mount the arm on the drive burr in less than full engagement. Such incomplete installation will not be readily apparent since the biasing spring will maintain the arm in its wiping poistion against the windshield. During operation the arm could readily be inadvertently displaced from the pivot shaft.

SUMMARY OF THE INVENTION

The improved arm retention latch of the present invention simplifies installation and removal by providing means permanently integrated with the arm for maintaining the arm in the proper attitude for installation or removal. Upon installation the latch is movable to an arm retention position. The design of the latch lever is such that if the wiper arm mounting head is not fully engaged on the knurled driver the arm cannot be released for movement to a wiping position against the windshield. Thus the latch lever serves a dual purpose in that the wiper arm must be properly installed to permit actuation of the latch lever, and the latch lever when actuated provides a positive retention of the wiper arm on the knurled driver. It further eliminates the requirement for a separate installation pin and the necessity for using an arm removal tool.

The present invention is particularly useful for wiper arms of the type disclosed in the above-mentioned Pat. 3,344,458 which utilizes a mounting head enveloped by a mounting head cover. In this form of wiper arm the latch level is secured to the mounting head for movement from the installation and removal position where it bears against the edge of the arm head cover or retainer, thus maintaining a wiper arm head in a proper attitude for installation to a latching position where it engages the bottom of the knurled driver for retaining the arm on the driver.

One form of the invention employs a latch lever mounted on the underside of the mounting head for pivotal movement from the installation and removal position to the latching position.

In another form of the invention a spring biased latch lever is slidably mounted for transverse movement on the mounting head. It is spring biased to the installation and removal position against the edge of the retainer maintaining the wiper arm head and may be depressed against the bias of this spring to a latching position where it engages the bottom of the knurled driver to retain the arm on the driver. In both forms the latch lever is retained in its latching position by the side walls of the arm retainer.

The principal object of the present invention is to provide an improved latch for retaining a windshield wiper arm on a pivot shaft which assures positive arm retention and which facilitates installation and removal.

Another object of the invention is to provide an improved latch for a windshield wiper arm assembly which assures full engagement of the arm head on the driver.

Other objects and advantages of the invention will be apparent from the following detailed description taken in conjunction with the accompanying drawings.

BRIEF DESCRIPTION OF THE DRAWINGS

FIG. 1 is a bottom elevational view of the wiper arm of this invention;

FIG. 2 is a fragmentary perspective view of the wiper arm partially exploded;

FIG. 3 is a fragmentary side elevational view of the wiper arm of this invention in its installation attitude showing its installed position in dotted lines;

FIG. 4 is a fragmentary sectional view taken on line IV—IV of FIG. 1;

DETAILED DESCRIPTION

Figure 5:
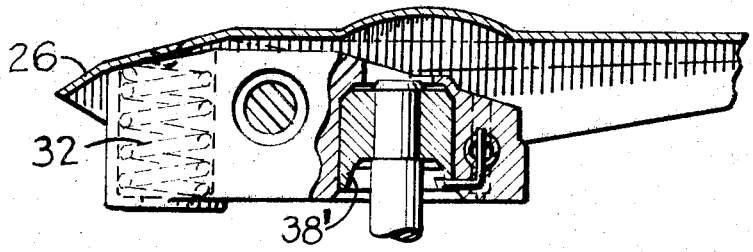
FIG. 5 is a fragmentary side elevational view, partially in section, of a modification of the invention.

FIG. 1 illustrates a wiper arm 10 having a mounting head 12 pivoted on a transverse pivot pin 14 to an arm retainer or mounting head cover member 16. A blade carrying arm extension 18 is secured to the outer end of the arm retainer 16 in any suitable manner as for example by riveting as at 20 and crimping as at 22. The arm extension 18 includes means 24 at its free end for securing a wiper blade (not shown) thereto. The mounting head cover 16 may be of substantially channel shaped configuration having a web portion 26 converging toward its outer end and legs or side walls 28 inclined toward the outer end.

The mounting head includes a pair of recesses 30 in which are seated compression springs 32 which constitute arm biasing means. The springs 32 bear against web 26 of the arm head cover. A driver or pivot shaft receiving recess 34 having a serrated inner surface is provided for receiving a pivot shaft 36 having a drive burr or driver 38 knurled or serrated as at 40 on its lateral periphery. The serrations 40 of the drive burr 38 mate with the serrations on the inner surface of recess 34 to provide a driving engagement. The mounting head 12 has an opening transversely therethrough intermediate the spring recesses 30 and the pivoting shaft retaining recesses 34 for journaling pivot pin 14 which extends through aligned openings in the side walls 28 of the retainer 26.

In the modification shown in FIGS. 1, 2 and 3 the mounting head 12 has a latch lever 42 pivoted thereto on an axis 44. The latch lever is stepped to include a portion 46 at its free end and a portion 48 adjacent to its pivotal end. A lug 50 depends from the surface 48 and has a transverse portion 51 at its free end which engages in a T slot 52 formed in the mounting head 12. The T slot 52 limits the pivotal movement of the latch lever 42 between its two end positions. Engagement of transverse portion 51 in T slot 52 relieves the stress on the pivotal connection at 44 when the arm assembly is in the installation and removal position. A slot 54 is provided in the mounting head 12 for receiving the portion 46 of a lever 42.

The wiper arm assembly as shipped will have the lever in the installation attitude as shown in FIG. 2 and in solid lines in FIG. 3. The portion 46 of a lever 42 will bear against the edge of the side wall 28 of the retainer 26 maintaining the wiper arm in the installation and removal attitude. In this position the recess 34 is open to receive the drive burr 38. The lever 42 will maintain the arm in a position displaced outwardly with the attached blade spaced from the windshield of a motor vehicle until the lever 42 is manually pivoted into the lock position with the portion 48 underlying the drive burr 38 and the portion 46 contained in the slot 54. When the latch is in the latching position the arm is released and free to assume a position urging the blades against the windshield as shown in dotted lines in FIG. 3 and in FIG. 1. The side wall 28 conceals and retains the latching lever in its latched position. In the event that the drive burr 38 is not in full engagement in the recess 34, the latch lever 42 cannot be moved to its locking position because the edge of portion 48 will engage the lateral periphery of the drive burr 38, thereby restraining its inward movement. The wiper blade in this attitude cannot engage the windshield. It will, therefore, be apparent to the installer that the installation is not proper.

If it is desired to remove the wiper arm assembly the arm is lifted until the latch lever 42 is clear of the retainer side wall 28. Manual rotation of the latch lever to the installation and removal position disengages it from the bottom of the knurled driver 38. The lock lever 42 again bears against the edge of the retainer side wall 28 maintaining the wiper arm in the proper attitude for removal as shown by full lines in FIG. 3.

Figure 6:
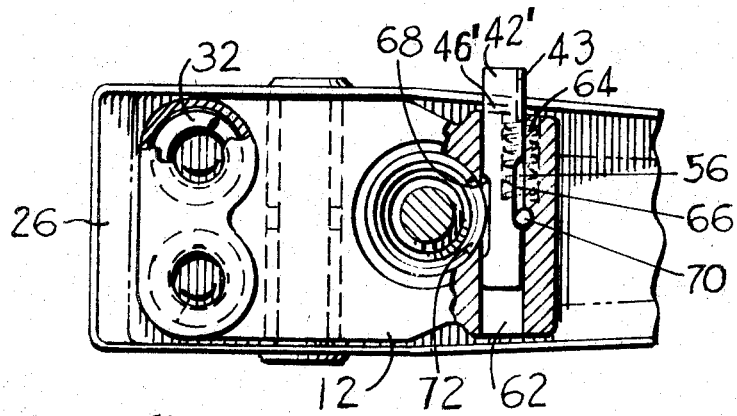
FIG. 6 is a fragmentary bottom elevational view, partially in section, with the modification shown in FIG. 5
Figure 7:
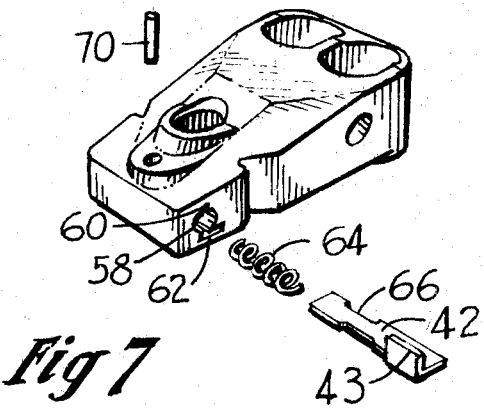
FIG. 7 is an exploded perspective of the mounting head for the embodiment shown in FIGS. 5 and 6.

Another embodiment, wiper arm assembly shown in FIGS. 5, 6 and 7, differs from the FIG. 1 embodiment in the specific details of the latching assembly. The mounting head 12 in this embodiment includes a transverse slot 56. A portion of the slot 56 is of L-shaped configuration. A cylindrical recess 58 intersects one leg 60 of the L slot. The leg 60 of the slot extends only partially through the mounting head 12 while the other leg 62 extends completely across the mounting head. The latch lever 42' is of flat stock having a perpendicular tab 43 adjacent one end thereof for reception of leg 60 of slot 56. A coil spring 64 is disposed in the recess 48.

The latch lever 42' is disposed in the leg 62 of the slot 56. A tab 43 is received in the leg 60. The spring 64 is retained in the recess 58 between the tab 43 and the base of the recess. The lever 42' is cut away as at 66 and 68 for a purpose to be explained hereinafter. A stop pin 70 is provided and extends into the leg 62 of the slot 56. Recess 66 receives the pin 70 and movement of the lever 42' is limited by engagement of the pin 70 with the ends of the cut-away portion 66. In this embodiment the drive burr 38' is undercut at 72. Thus it can be seen that the lever 42' includes a portion 46' which is normally biased outward to bear against the edge of the side wall 28 of the retainer 26. When depressed against the bias of spring 64, portion 46' engages the undercut portion 72 of the drive burr 38'. The cut-away 68 of the lever 42' opens the recess 34 to permit insertion of the drive burr 38 therein when the lever 42' is in its normal outwardly biased position.

The wiper arm assembly as shipped will have the lever 42' in the installation and removal position biased by the spring 64 and bearing against the edge of the retainer side wall 28. When the drive burr 38' is fully engaged in the recess 34 the lever 42' can be depressed so that the portion 46' engages the undercut portion 72 of the drive burr 38', retaining the drive burr in position. The arm may then be released to assume the operative position. The lever 42' is held in its locking position by engagement with the inner surface of the side wall 28. In the event that the drive burr 38' is not fully engaged in the recess 34 the lever 42' cannot be depressed since the edge of the cut-away 68 will engage the periphery of the drive burr 38. It cannot over-ride the cut-away portion 72.

When it is desired to remove the wiper arm assembly the arm is lifted against the bias of compression springs 32 to a position where the lever 42' is free to be urged outwardly to its installation and removal position. The arm then can be lifted off the drive burr.

It should now be apparent that a unique mounting head latch has been provided for positively retaining the arm on the drive burr, for maintaining the arm in the proper attitude for installation and removal, and for insuring that the drive burr will be properly and fully engaged in the mounting head recess during assembly. Certain specific embodiments of the invention have been described for the purpose of illustration but it will be apparent that various modifications and other embodiments are possible within the scope of the invention. It is to be understood, therefore, that the invention is not limited to the specific arrangements shown but in its broadest aspect it includes all equivalent embodiments and modifications which come within the scope of the invention.

What is claimed is:

1. A windshield wiper assembly comprising a windshield wiper arm for mounitng on a pivot shaft assembly including a drive burr, said arm including a mounting head, a mounting head retainer including side walls having a portion straddling a portion of said mounting head, said mounting head and mounting head retainer being hingedly connected together about a transverse pivot pin, an outer arm wiper blade carrying extension operatively secured to said mounting head retainer, a recess in said mounting head for receiving said drive burr in driving engagement, biasing means acting between said retainer and said mounting head about said transverse pivot pin for transmitting wiping pressure to a wiper blade through said wiper arm, a latch lever located at said mounting head movable from an installation and removal position extending from said mounting head and having a portion bearing on an edge of one of said side walls to thereby overcome the biasing means while clearing said recess to a latching position having a portion overlying the bottom end of said drive burr to thereby retain said drive burr in said recess while releasing the retainer for movement to an operative position.

2. A combination according to claim 1 wherein said latch lever is pivotally mounted on said mounting head.

3. A combination according to claim 2 wherein said latch lever includes a lug retained in a slot in said mounting head for limited movement to thereby relieve the stress on the pivotal connection between the latch lever and the mounting head and to limit the angular movement of the latch lever.

4. A combination according to claim 1 wherein said latch lever is mounted for transverse sliding movement relative to said mounting head.

5. A combination according to claim 4 including biasing means for urging said latch lever to the installation and removal position.

6. A combination according to claim 5 including stop means for limiting transverse sliding movement of said latch lever.

7. A combination according to any of claims 1, 4 or 6 wherein said latch lever is disposed for engagement with the interior surface of one of said side walls in the locked position.

References Cited

UNITED STATES PATENTS

| | | | |
|---|---|---|---|
| 2,994,900 | 8/1961 | Smithers | 15—250.34 |
| 3,126,216 | 3/1964 | Krohm | 15—250.34 X |
| 3,344,458 | 10/1967 | Deibel et al. | 15—250.35 |

ROBERT W. MICHELL, Primary Examiner

P0-1050
(5/69)

UNITED STATES PATENT OFFICE
CERTIFICATE OF CORRECTION

Patent No. 3,512,205      Dated May 19, 1970

Inventor(s) W. C. Riester, et al

It is certified that error appears in the above-identified patent and that said Letters Patent are hereby corrected as shown below:

On sheet 1 and sheet 2 of the drawings, at the top of the page, please change the inventors' name from "W. C. Reister et al" to --W. C. Riester et al--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents